UNITED STATES PATENT OFFICE.

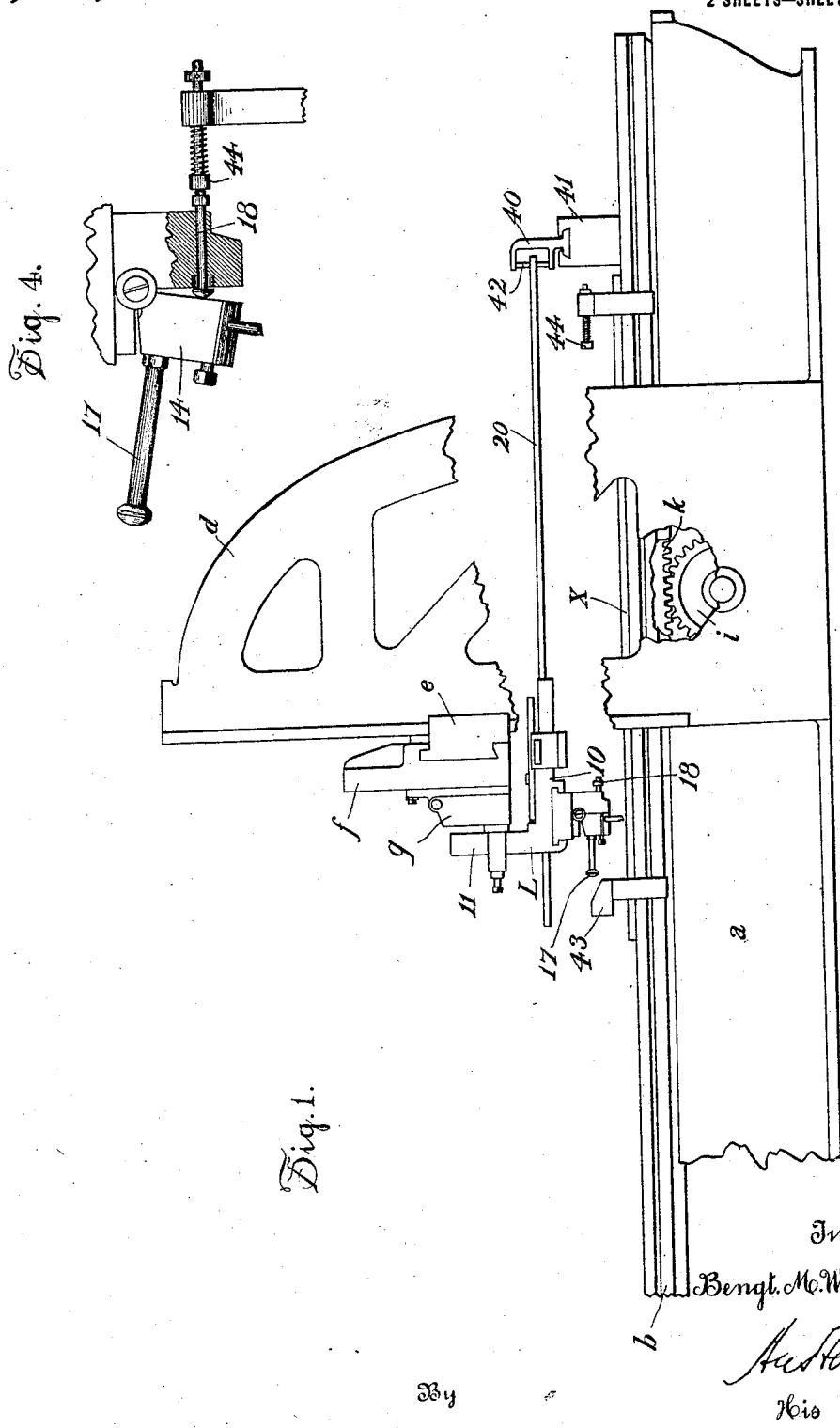

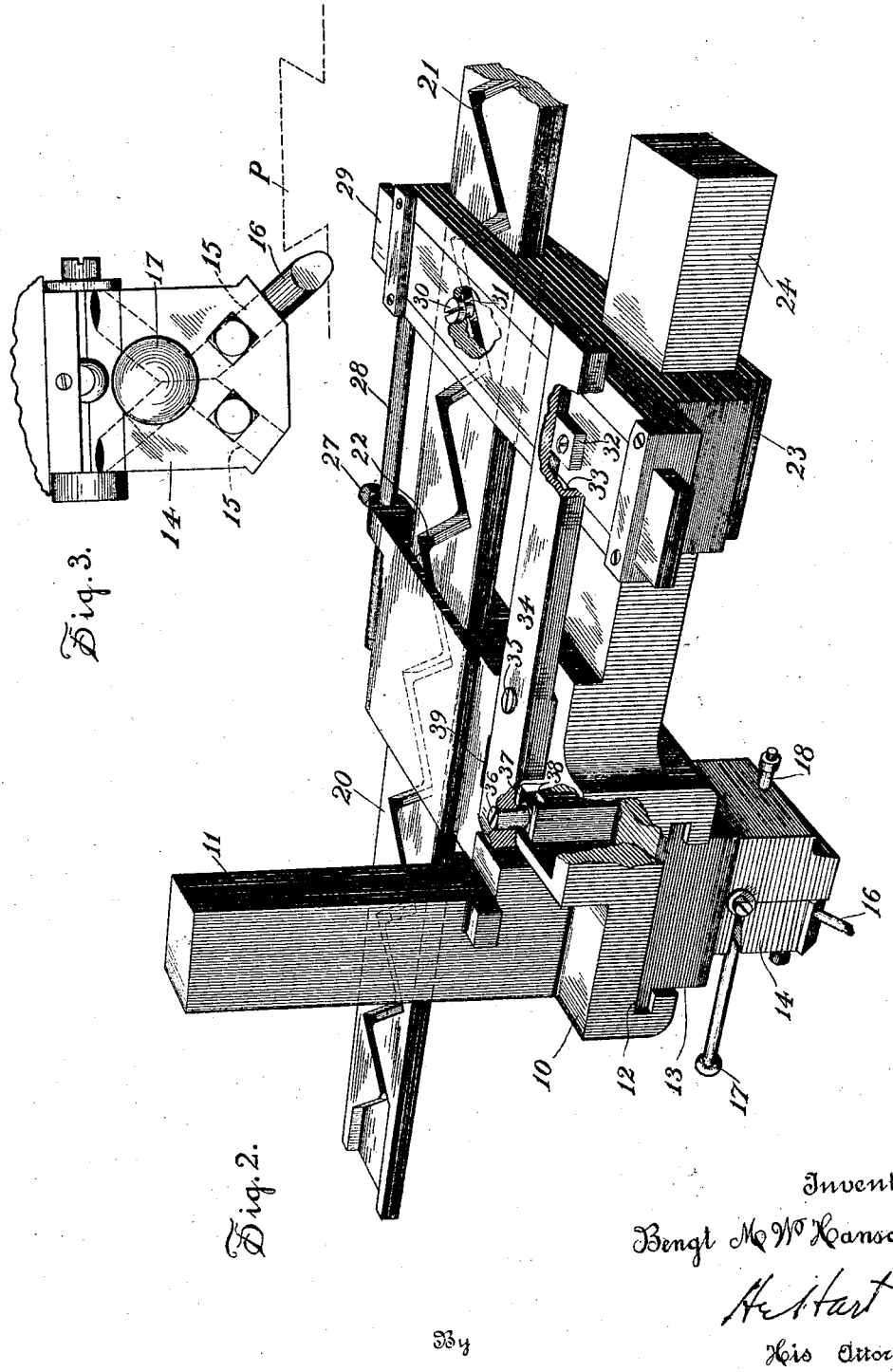

BENGT M. W. HANSON, OF HARTFORD, CONNECTICUT.

METAL-WORKING MACHINE.

1,415,341. Specification of Letters Patent. Patented May 9, 1922.

Application filed January 16, 1920. Serial No. 351,799.

*To all whom it may concern:*

Be it known that I, BENGT M. W. HANSON, a citizen of the United States, residing at Hartford, in the county of Hartford, State of Connecticut, have invented certain new and useful Improvements in Metal-Working Machines, of which the following is a specification.

It is the object of the present invention to provide means for mechanically forming, with efficiency and accuracy, zig-zag or serpentine grooves in surfaces of parts or articles of various kinds.

The device of the present invention is particularly adapted to be used in combination with or as a part of a machine wherein the surface to be grooved is machined, the organization and arrangement being such that the grooving operation may be carried out, after the surface of the work is machined, without re-truing or in any way disturbing the position of the work and this results in a saving of time and labor.

While the device of the present invention is susceptible for use generally in forming zig-zag or serpentine grooves wherever the same are desired, it has particular adaptability in the forming of oil grooves in the surfaces of machine parts and, therefore, in the present disclosure I illustrate and describe the invention as being applied to this use but it is to be understood that this disclosure is by way of illustration only and it is not to be taken as restrictive.

Furthermore, while I have shown the device of the present invention as forming an attachment to a planer, it is to be understood that it may be attached to or incorporated in machines of other types.

In the accompanying drawings:

Fig. 1 is a side elevational view of a planer to which the device of the present invention is applied, the showing being more or less diagrammatical.

Fig. 2 is a perspective view of the device of the present invention.

Fig. 3 is a front elevational view of the clapper thereof, and

Fig. 4 is a detail view showing the manner in which the grooving tool is raised out of engagement with the work when the latter reaches the end of its return stroke.

The planer, illustrated diagrammatically in the drawings, is shown only in part, as the specific construction thereof is immaterial. The planer is shown for illustrative purposes as having a bed $a$; a work support or table $b$ mounted for rectilinear movement on the bed; standards or housings $d$ rising from the bed and carrying a cross rail $e$; a saddle $f$ adjustable transversely on the rail $e$, and a clapper $g$ mounted for vertical adjustment in the saddle $f$. The work support $b$ may be moved on the bed in any suitable manner as, for instance, by a driven gear $i$ meshing with a rack $k$ on the bottom of the support.

The letter L designates generally the grooving device. This device has a holder 10 provided with an upstanding shank 11 adapted, as shown in Fig. 1, to be secured to the tool post of the clapper $g$ in the same manner as is the usual planer tool. On the bottom of the holder 10 is a transverse way 12 in which slides a tool support or carriage 13 having a clapper 14 provided with angularly disposed sockets 15 either of which is adapted to receive the shank of a groove forming tool 16. The sockets 15 are angularly disposed so that a groove may be formed in a surface lying beneath an undercut part such as the dove-tailed gib $p$ shown in dotted lines Fig. 4. Extending forwardly from the clapper is a finger 17. Slidably mounted in the holder 10 and having engagement at its forward end against the clapper is a plunger 18.

20 is a cam plate having a zig-zag groove 21 which, through the connections to be described, causes the tool support 13 to move back and forth when the cam plate is moved longitudinally. The cam plate in the present instance has a sliding fit in an opening 22 through the holder 10, and the rear end of the cam plate is anchored to the work table. The numeral 23 designates a block having openings, as shown, through which pass the cam plate 20 and an arm 24 extending rearwardly from the holder 10. The block 23 may be held in adjusted position on the arm 24 by binding a set screw 27 against the rod 28 carried by the block. In the block 23 is a slide 29 carrying a rotatable stud 30 the lower end of which is in the form of a diamond shaped block 31 which works in the cam groove 21. Rotatably carried by the slide 29 is a block 32 which works in a groove 33 in the under surface of a lever 34 pivoted as at 35 to the holder 10. Rotatably carried by the forward end of the lever 34 is a stud 36 having its lower end in the form of a square block 37 positioned between a pair of lugs 38 extending upwardly from the tool support 13. The lugs 38 are adapted to move back and forth in an elongated slot 39 through the holder 10.

In the present illustrative disclosure of the invention, the rear end of the cam plate 20 is connected to an anchor 40 having a sliding fit in a T-shaped slot in a rail 41 fixed to the work support $b$ of the planer. The anchor 40 has a pintle 42 which loosely passes through an opening in the cam plate 20 to permit of vertical adjustment of the grooving device L. Adjustably carried by the work support $b$ are a dog 43 and a spring pressed plunger 44 adapted to respectively engage the finger 17 and the plunger 18 which cooperate with the clapper 14.

The operation is briefly as follows: After the work designated by the numeral X has been machined in the planer, the planer tool is removed from the clapper $g$ and the grooving device L is attached and adjusted to operate upon the surface to be grooved. Upon setting the planer in operation, the work support will move rectilinearly on the bed $a$ and the cam plate 20 since it is anchored to the work support will move therewith. Due to the groove 21 in the cam plate, the diamond shaped block 30 will move back and forth and this movement is communicated through the slide 29 and the rocking lever 34 to the tool support 13 so that the tool 16 will be moved back and forth on a line at right angles to the line of movement of the work support. The result is that on the working stroke of the work support, that is as it moves to the right, in Fig. 1, the grooving tool will cut a zig-zag groove in the surface of the work. As the work support approaches the end of its working stroke, the dog 43 will engage the finger 17 of the clapper, thereby raising the tool out of engagement with the work at a point where it is desired to terminate the groove. On the return stroke of the work, the grooving tool will ride idly thereover and as the work approaches the end of its return stroke, the spring pressed plunger 44 will engage the plunger 18 whereupon the tool is raised out of engagement with the work, as shown most clearly in Fig. 4. As the work support starts on its working stroke, the plunger 18 will move away from the spring pressed plunger 44 allowing the tool to drop into cutting relation to the work. The arrangement of these plungers 18 and 44 insures that on each working stroke of the work, the tool will start its cut at the same exact point. The work support is moved back and forth until a groove of the desired depth is obtained.

It will be readily seen that the distance through which the tool 16 is moved back and forth may be varied by adjusting the block 23 on the arm 24 so as to bring the block 32 which connects the slide 29 to the lever 34 nearer or farther away from the pivotal point 35 of the lever 34.

While the form of the device herein shown and described is admirably adapted to fulfill the objects of the invention, it is to be understood that it is not intended to confine the invention to the embodiment shown herein, as it is susceptible of embodiment in various forms all coming within the scope of the claims which follow.

I claim as my invention:—

1. In a metal working machine, a work support, a tool support movable rectilinearly one relative to the other in one direction, means for moving said tool support back and forth a plurality of times in another direction to effect a zig-zag cut, and means for varying the extent of movement of said tool support.

2. In a metal working machine, a work support, a tool support, mechanism for rectilinearly moving said work support in one direction, means anchored to the work support for moving the tool support back and forth in another direction, and a variable connection between said means and said tool support for varying the extent of movement of the latter.

3. In a metal working machine, a work support, a tool support, means for moving said work support in one direction, a pattern plate anchored to said work support and movable relative to said tool support, and a connection between said pattern plate and said tool support whereby the latter is moved back and forth upon rectilinear movement of said work support, said connection being adjustable for varying the extent of movement of said tool support.

4. In a metal working machine, a work support, a tool support, means for moving said work support in one direction, a pattern plate anchored to said work support and having a zig-zag groove, and a connection between said plate and tool support including a lever, the effective length of which is adjustable to vary the extent of movement of said tool support.

5. In a metal working machine, a work support, mechanism for moving said work support in one direction, a holder, a tool support slidable thereon, and means for moving the tool support back and forth in another direction, said means being anchored to said work support and supported by said holder.

6. In a metal working machine, a work support, mechanism for moving said support in one direction, a holder, a tool support slidable thereon in another direction, a pattern plate anchored to said work support and slidably supported by said holder, and a connection between said pattern plate and tool support whereby the latter is moved back and forth upon movement of said work support.

7. In a metal working machine, a work support, mechanism for moving said support in one direction, a holder, a tool support slidable thereon in another direction, a pattern plate anchored to said work support and slidably supported by said holder, and a connection between said pattern plate and tool support whereby the latter is moved back and forth upon movement of said work support, said connection being adjustable to vary the extent of movement of said tool support.

8. In a metal working machine, a work support, a holder, a tool support slidable thereon, a cutting tool on said tool support, a pattern plate anchored to and vertically adjustable relative to said work support, said pattern plate being slidably supported by said holder, and a connection between said plate and tool support whereby the latter is moved back and forth upon movement of said work support.

9. In a metal working machine, a work support, a tool support having a clapper, a tool carried thereby, means for relatively moving said supports, and means for lowering said clapper on the commencement of each working stroke to insure that the tool will always start to cut at the same point.

10. In a metal working machine, a work support, a tool support having a clapper, a tool carried thereby, means for relatively moving said supports, means for lowering the clapper at the beginning of each working stroke and means for raising the clapper at the end of each working stroke.

11. In a metal working machine, a holder, a tool support slidable thereon, a groove forming tool on said support, a pattern plate supported by and movable relative to said holder, a member cooperating with said plate, and a connection between said member and the tool support whereby the latter is moved back and forth upon movement of said plate relative to said holder.

12. In a metal working machine, a holder, a tool support slidable thereon, a groove forming tool on said support, a plate movable relative to said holder and having a zig-zag groove, a member working in said groove, and a variable connection between said member and tool support whereby the latter is moved back and forth upon movement of said plate relative to said holder.

13. In a metal working machine, a holder, a tool support slidable thereon, a plate slidable through said holder and having a zig-zag groove, a block adjustable on said holder, a slide on said block, a stud on said slide and having one end working in said groove, a lever pivoted on said holder and having one end longitudinally grooved, a second stud on said slide having one end positioned in the groove of said lever, and a connection between the other end of said lever and said tool support.

14. In a machine of the character described, a work support, a tool support having a clapper, a tool carried thereby, means for relatively moving said supports, and a spring pressed plunger on said work support and cooperating with said clapper to swing it on said tool support.

BENGT M. W. HANSON.